March 26, 1940.    J. MEISSNER    2,194,666
NITRATION OF AROMATIC HYDROCARBONS
Original Filed Oct. 31, 1935
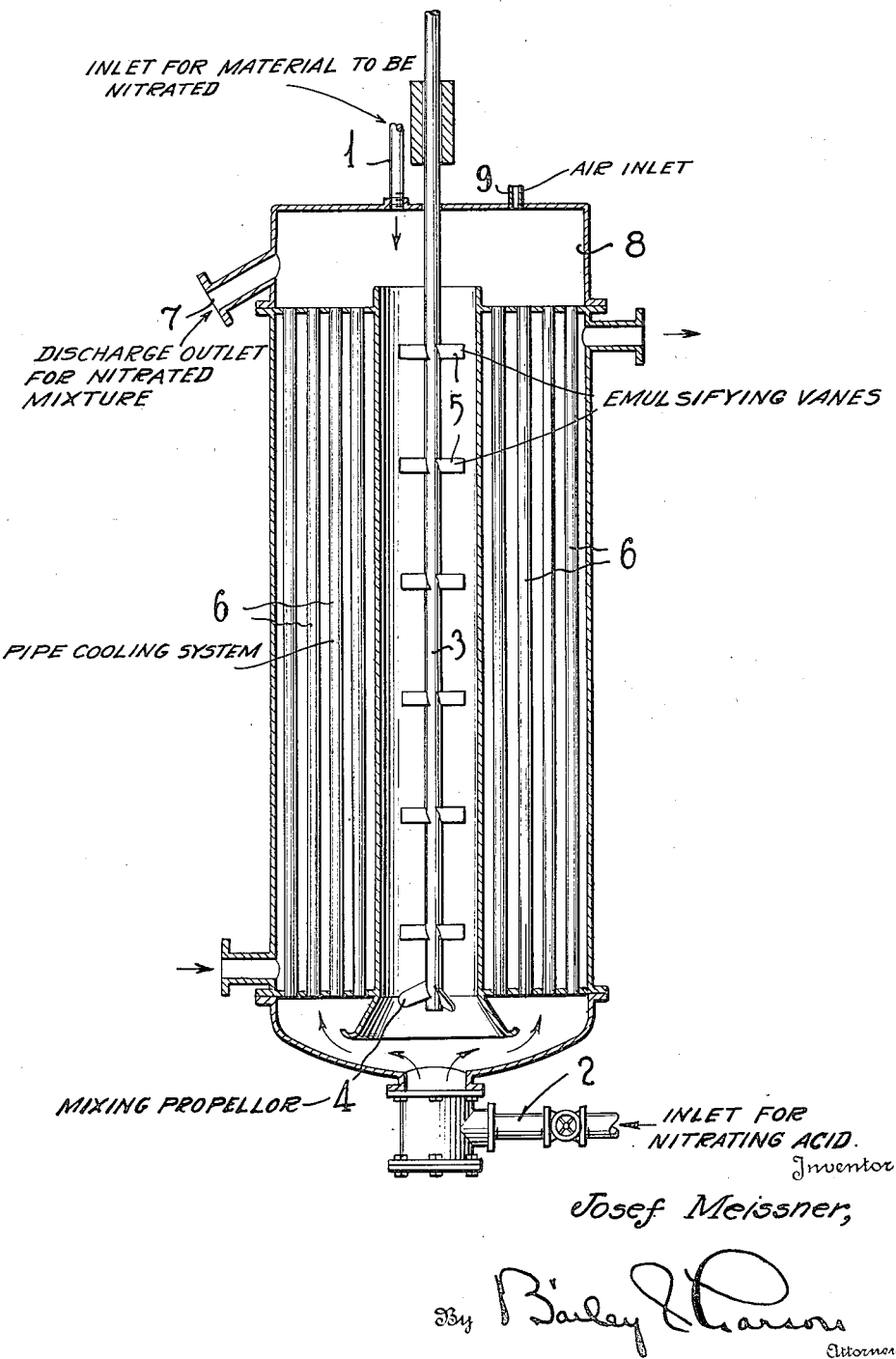
Inventor
Josef Meissner,
By Bailey & Parsons
Attorneys Patented Mar. 26, 1940

2,194,666

UNITED STATES PATENT OFFICE 2,194,666

NITRATION OF AROMATIC HYDROCARBONS

Josef Meissner, Burbach, Kreis Siegen, Germany

Original application October 31, 1935, Serial No. 47,727, now Patent No. 2,135,012, dated November 1, 1938. Divided and this application July 16, 1937, Serial No. 154,086

5 Claims. (Cl. 23—266)

The invention relates to improvement in apparatus for the nitration of aromatic hydrocarbons. The object of the invention is to provide an apparatus which allows continuous nitration of hydrocarbons, and which has the advantage that a safe operation and a good output are obtained while using an apparatus of very small dimensions. This application is filed as a division of my copending application Serial Number 47,727, filed October 31, 1935.

Heretofore, nitro-products of the kind referred to have been produced in a relatively large apparatus and by methods employing a number of separate operations. These methods were disadvantageous in that it was very difficult to dissipate the heat of reaction and to reduce the time of reaction to a minimum. Other disadvantages, such as, incomplete mixing of the nitrating mixture and insufficient accessibility of the nitrating acid to the aromatic hydrocarbons to be nitrated are of special note. These disadvantages greatly influence nitration processes and reduce their output considerably.

With the new apparatus it is possible to nitrate the aromatic hydrocarbons thoroughly in one working step and to avoid the disadvantages referred to above completely.

The new apparatus provides for continuous introduction of the hydrocarbons to be nitrated into the upper part of a vessel which is provided with a pipe cooling system and continuous introduction of the nitrating acid into the lower part of said vessel whereby a forced circulation is obtained within the vessel, the nitrated material being discharged at the upper part of the nitrating vessel. By this arrangement, a preliminary nitration is obtained in the upper part of the vessel as, at this point, the nitrating acid which has been introduced at the lower part of the nitrating vessel has been partly consumed and therefore diluted, whereas the final nitration takes place in the lower part of the vessel where the fresh nitrating acid is introduced. In order to obtain a complete mixture of the nitrating components and to produce an emulsion of the nitrating mixture by the introduction of finely divided air, the mixture within the nitrating vessel is stirred by an agitating device which has a mixing propeller at its lower part and vanes for emulsifying purposes at its upper part.

A preferred embodiment of the invention is illustrated in the accompanying drawing. This drawing shows a sectional view of the apparatus with which the new nitrating process is carried out.

Referring to the drawing, an upright nitrating vessel 8 is shown provided with an upright pipe cooling system 6 which is in the form of an annulus leaving free a central portion of the vessel and spaced between the top and bottom of the nitrating vessel, and an agitating device 3 extending from the top of the nitrating vessel down through the central portion of the vessel left free by the pipe cooling system. This agitating device 3 comprises a shaft, the lower portion of which is provided with a mixing propeller 4 for circulating the materials in the vessel down through the central portion of said vessel and up through said pipe cooling system, and vanes 5 for emulsifying purposes. At the bottom of the vessel a valve 2 is provided for the introduction of the nitrating acid, whereas a pipe 1 is provided at the upper part of the vessel for the introduction of the hydrocarbons to be nitrated. An opening 7 is provided in the upper portion of the vessel for discharging the products of the apparatus and an opening 9 is provided in the top of vessel 8 to permit access of air to the interior of the vessel.

After the apparatus has been filled with nitrating acid the material to be nitrated, as for example, toluene, is introduced through the pipe 1. At the same time the agitating device is started in order to obtain a complete mixture of the component parts, which is very important for efficient nitration. By the action of the agitating device, the mixture is not only stirred but also emulsified as air is introduced into the nitrating mixture in a finely divided state. This causes a subdivision of the nitrating mixture into small drops whereby a greater nitrating surface is produced. This in turn causes an acceleration of the nitrating process and a more uniform product. It has been found that by emulsifying the mixture with air the formation of nitric oxides could be prevented almost entirely.

The air which is distributed in the mixture in a very finely divided state makes possible a very quick separation of the nitrated material from the adhering waste acid in the separator (not shown). By introducing the nitrating acid into the lower part of the nitrating vessel at 2 the nitrating acid, which is diluted by the preliminary nitration, is replaced by the fresh acid and a final nitration is obtained at this point. This final nitration could previously only be obtained in several separated steps.

The fact that the nitrating mixture is forced through the space between the cooling system 6 during the nitration process is of special importance. In this way the heat of reaction is dissipated more rapidly than has been heretofore possible in the known nitrating devices.

The nitrating mixture discharged through the opening 7 at the upper part of the vessel is proportionate to the amount of aromatic hydrocarbons introduced into the upper part of the nitrating vessel and the amount of nitrating acid introduced into the lower part of said vessel.

The advantages obtained with the new apparatus may be shortly summarized as follows:

1. Continuous nitration which is obtained by the circulation of the nitrating mixture.
2. Great nitrating surface which is obtained by the intensive stirring of the nitrating mixture with an agitating device having a mixing propeller and vanes for emulsifying purposes, at spaced intervals thereabove.
3. Prevention of the formation of nitric oxides which is obtained by the emulsification of the nitrating mixture with air.
4. Accelerated separation of the nitrated mixture in the separator which is caused by the presence of the air which is distributed in a finely divided state in the mixture.
5. Intensive cooling of the finely divided nitrating mixture in the nitrating vessel which is obtained by the pipe cooling system.
6. Large output of a nitrating apparatus which has small dimensions, this feature being of special advantage when working with explosives.

While I have described herein some embodiments of my invention, I wish it to be understood that I do not intend to limit myself thereby except within the scope of the appended claims.

What I claim is:

1. An apparatus for the continuous nitration of aromatic hydrocarbons comprising a nitrating vessel, a pipe cooling system comprising a plurality of vertical pipes adapted to be surrounded by a cooling medium located within said vessel, a valve in the lower portion of said vessel for introducing the nitrating acid, means in the upper portion of said vessel for introducing the material to be nitrated, means in the upper portion of the vessel for discharging the nitrated mixture, mechanical means disposed within said vessel for emulsifying the materials introduced into said vessel and mechanical means within said vessel for circulating the said materials through the pipes of said cooling system, said last two means being located in a space in the vessel adjacent to the pipe cooling system.

2. An apparatus for the continuous nitration of aromatic hydrocarbons comprising a nitrating vessel, a pipe cooling system comprising a plurality of vertical pipes adapted to be surrounded by a cooling medium within said vessel, a valve in the lower portion of said nitrating vessel for introducing the nitrating acid, means in the upper portion of said vessel for introducing the material to be nitrated, means in the upper portion of said vessel for discharging the nitrated mixture, an agitating device in said vessel the lower portion of which comprises a mixing propeller for circulating the materials introduced into the vessel through the pipes of said cooling system and the upper portion of which comprises vanes for emulsifying the materials introduced in said vessel said agitating device being located in a space in the vessel adjacent to the pipe cooling system.

3. An apparatus for the continuous nitration of aromatic hydrocarbons comprising an upright vessel, an agitating device centrally disposed in said vessel, said agitating device comprising a shaft, a mixing propeller located on the lower portion of said shaft and emulsifying vanes on said shaft at spaced intervals above said propeller, a vertical pipe cooling system within said vessel located between said agitating devices and the vertical walls of said vessel and spaced between the top and bottom walls of said vessel, a valve in the lower portion of said nitrating vessel for introducing the nitrating acid, means in the upper portion of said vessel for introducing the material to be nitrated, and means in the upper portion of said vessel for discharging the nitrated mixture.

4. An apparatus for the continuous nitration of aromatic hydrocarbons comprising an upright vessel, an upright pipe cooling system within said vessel, said system being in the shape of an annulus and leaving free the central vertical portion of the vessel, means in the upper portion of the said vessel for introducing the material to be nitrated, valve means in the lower portion of the vessel for introducing the nitrating acid, an agitating device centrally disposed within said vessel extending from the top of said vessel to the lower portion of said pipe cooling system, said agitating device comprising a shaft the lower portion of which is provided with a propeller adapted to circulate the materials introduced into said vessel downwardly through the central vertical portion of the vessel and vanes at spaced intervals above said propeller for emulsifying the material introduced into said vessel and means in the upper portion of the vessel for withdrawing the nitrated mixture from said vessel.

5. An apparatus for the continuous nitration of aromatic hydrocarbons comprising an upright vessel, an upright pipe cooling system within said vessel, said system being in the shape of an annulus and leaving free the central vertical portion of the vessel, means in the upper portion of the said vessel for introducing the material to be nitrated, valve means in the lower portion of the vessel for introducing the nitrating acid, an agitating device centrally disposed within said vessel extending from the top of said vessel to the lower portion of said pipe cooling system, said agitating device comprising a shaft the lower portion of which is provided with a propeller adapted to circulate the materials introduced into said vessel downwardly through the central vertical portion of the vessel and vanes at spaced intervals above said propeller for emulsifying the material introduced into said vessel and introducing finely divided air into such material and means in the upper portion of the vessel for withdrawing the nitrated mixture from said vessel.

JOSEF MEISSNER.